Patented May 23, 1950

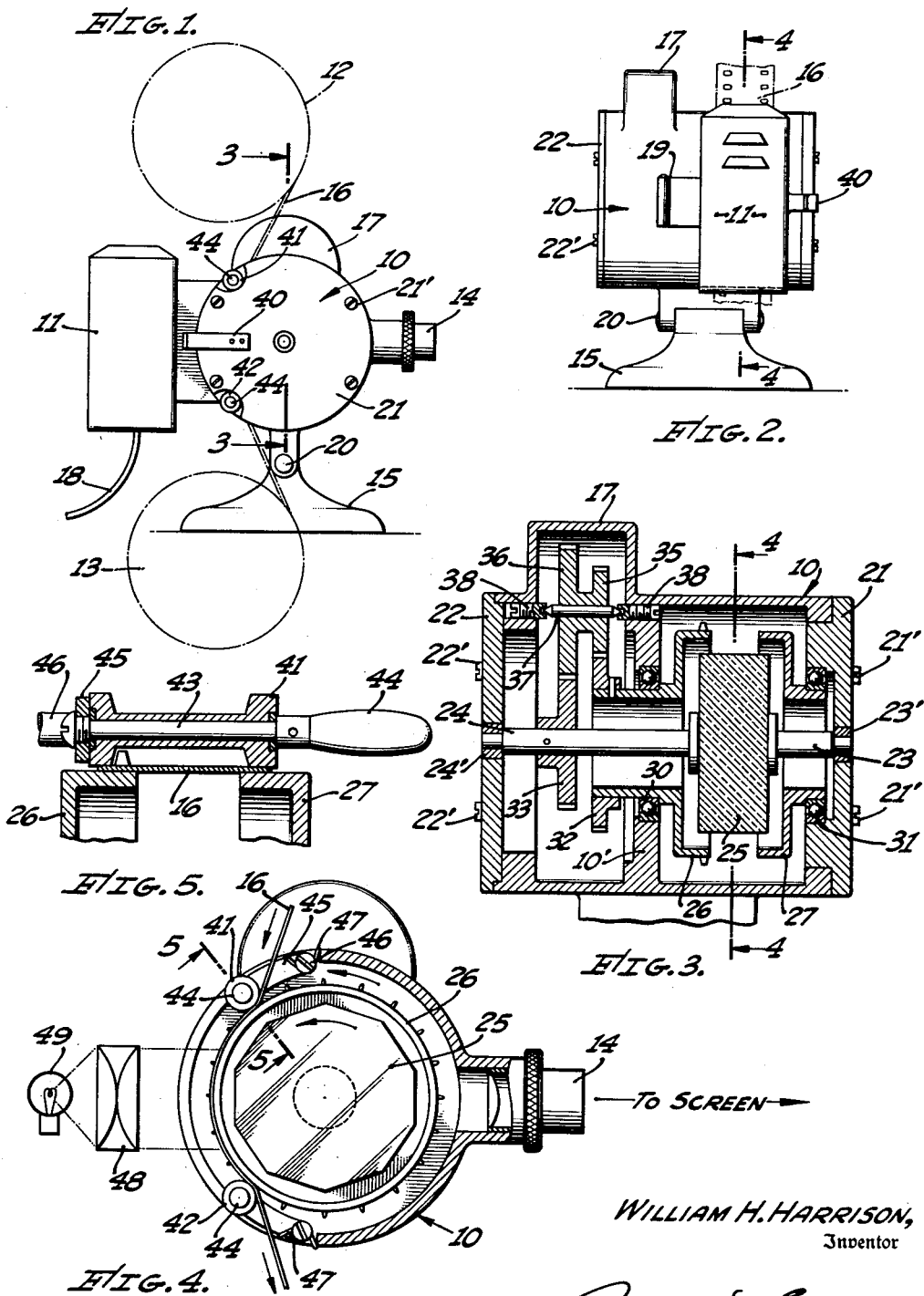

2,508,789

UNITED STATES PATENT OFFICE 2,508,789

CONTINUOUS MOTION FILM MECHANISM

William H. Harrison, Los Angeles, Calif.

Application January 20, 1947, Serial No. 723,166

3 Claims. (Cl. 88—16.8)

This invention relates generally to cinematography and more particularly to motion picture taking and/or projecting apparatus through which the film moves continuously instead of intermittently as in conventional equipment.

As described in my copending application No. 689,594 filed August 9, 1946, now Patent No. 2,482,179 dated September 20, 1949, which deals with the same general subject and wherein I have shown my invention embodied in a projector, I make use of a rotating polygonal prism interposed in the optical system to arrest the successive images as they are projected on a screen while permitting the film to move smoothly and continuously through the projector. In order to synchronize the rotation of the prism with the motion of the film, the former is driven by a sprocket engaged with the moving film. Conversely, the prism may be power driven and the same interposed driving element will effect motion of the film.

Insofar as these basic principles are concerned, the present invention operates in the same manner as my previously disclosed apparatus. One important improvement provided in the present apparatus however, is that sliding contact of the film surfaces with stationary mechanical parts is entirely eliminated.

Sliding contact of the film as just described has long been the bane of the motion picture art. Where the image areas of the film slide past stationary "gates" and other mechanical parts such as backing plates for example, these film surfaces eventually become scratched in spite of painstaking efforts that are made to polish the mechanical parts and to exclude dust and other abrasive matter from the mechanism. Such scratches, even though minute, produce an effect known as "rain" which is highly detrimental to the quality of the projected image.

Even when the frame area of the film is protected from sliding contact, and such contact is limited to the edge areas of the film, the abrasive action above referred to produces small fragments or shavings of emulsion or film which find their way into the projection gate and interfere seriously with the projected image.

In conventional intermittent-type film mechanisms, the use of projection gate guides which move with the film thus to avoid sliding contact therewith is impractical since mechanical elements as large as film guides possess considerable inertia and cannot be intermittently moved and stopped with the film at a rate on the order of twenty-four times per second as would be required for modern motion picture projection. In my continuous motion apparatus, however, it is feasible, and in fact convenient, to permit the film projecting gate to roll with the film, since this motion is continuous and the inertia of the moving parts is not a factor except in that it is beneficial in steadying the motion of the film.

Bearing in mind then the disadvantages arising from sliding contact of the film with stationary projection gates and the like, it is a major object of this invention to provide a film moving and image arresting system suitable for cinematography and cinematic projection in which the film surfaces are subjected to no sliding abrasive action whatsoever.

It is another object of my invention to provide continuous motion picture apparatus in which a rotating prism is driven by a moving film or vice versa, and in which a minimum of intervening drive elements are employed whereby to substantially eliminate "back-lash" in the mechanism.

The foregoing and other objects and advantages of my invention will become more apparent from the following detailed description and attached drawings thereof, in which:

Figure 1 is a side elevational view of a motion picture projector embodying my invention;

Figure 2 is a rear elevational view thereof;

Figure 3 is an enlarged elevational section taken on the line 3—3 in Figure 1;

Figure 4 is a partial elevational section taken on the line 4—4 in Figs. 2 and 3; and Figure 5 is an oblique section taken on the line 5—5 in Figure 4.

Referring now to the drawings, and particularly to Figure 1 thereof, it will be seen that the numeral 10 indicates a generally cylindrical housing which encloses the mechanism and optical system of the projector embodying my invention. Hingedly secured to the back of the housing 10 by means of a hinge 19, is a lamp housing 11 which contains a projection lamp 49 and condensor lens system 48 which are shown schematically in Figure 4. A releasable snap catch 40 is provided to hold the lamp housing 11 in the closed position shown in Figure 1. The projection lamp and lens of my projector do not differ materially from those of the prior art, and hence need no detailed description herein.

Film is supplied to and taken up from the projector on a pair of conventional reels 12 and 13 which may be mounted either on the framework of the projector itself or on separate spindles. The reels 12 and 13, either or both, may be driven by any of a number of drive means such as are well known in the art; for example, belt drives, gear drives, friction rollers, and the like. Since the invention dealt with herein resides in the construction of the projector itself, and since this projector is adapted to receive and deliver film from and to any conventional supply and take-up reels, respectively, no detailed description of the reel mounting and driving means is necessary herein.

Referring now to Figure 4, it will be seen that the film 16 enters the projection mechanism from the top, passing under a pressure roller 41, engaging a sprocket 26, passing under a second pressure roller 42, and hence out the bottom of the mechanism. Thus it will be seen that the passage of the film through the projection mechanism from the top to the bottom, as described, effects counterclockwise rotation of the sprocket 26 as viewed in Figure 4. As can be seen best in Figure 4, a portion of the housing 10 is cut away between the pressure rollers 41—42 in order that light may pass from the lamp housing 11 through a frame area of the film 16.

The mechanism described and illustrated herein is intended for use with 16 mm. film, although obviously by enlargement of the parts, 35 mm. or other sizes of motion picture film can be accommodated.

In 16 mm. film it is the usual practice to provide one sprocket hole on each edge of the film for every frame. Thus it can be seen from the number of teeth on the sprocket 26 that in the present apparatus the rate of film travel through the mechanism is twenty frames for each revolution of the sprocket.

In order to arrest the images of successive frames in the moving film, it is necessary that the prism have an even number of facets and that the number of frames and the number of facets crossing the optical axis be the same during any period of time. A prism having half the number of sides as there are frames on the periphery of the sprocket 26; that is, a ten-sided prism, should rotate at twice the speed of the sprocket 26 to fulfill the above conditions. Obviously other combinations of facet numbers, sprocket size, and gear ratios are possible which achieve the same result.

For a detailed description of the mountings of the rotating sprocket 26 and the prism 25, reference should now be had to Figure 3 wherein it will be seen that the prism 25 is mounted on a pair of axial stub shafts 23 and 24 which have terminal flanges by which they are cemented to the opposite bases of the prism 25. (The term "base" as applied to the prism herein is used in its geometric meaning. That is, a "base" of the particular prism disclosed herein is a decagon). The needle point shafts 23 and 24 run in jewel or hardened steel bearings 23' and 24' which reduce friction to a minimum and are secured in end plates 21 and 22 of the housing 10. End plates 21 and 22 are secured into the housing 10 by means of screws 21' and 22'.

The sprocket 26 is coaxial with the prism 25, and is rotatably supported on a bearing 30 which in turn is pressed into an intermediate wall portion 10' of the housing 10. As is best seen in Figures 3 and 5, the film is supported by its two edges which rest one on the sprocket 26, and one on an idler roller 27. The idler roller 27 is of the same diameter as the sprocket 26, and is similarly mounted by means of a bearing 31 pressed into the housing end plate 21.

As can be best seen in Figure 5, the pressure roller 41 has a reduced diameter in its central portion so that pressure against the film 16 is applied only at the edges where they rest on the sprocket 26 and the idler roller 27. The upper pressure roller 41 turns on a fixed shaft 43 which is secured in the pivotally mounted and spring-urged arm 45. The arm 45 is pivotally secured to the wall section 10' of the housing 10 by means of a shoulder screw 46 and a conventional spiral spring 47 is also secured on the screw 46, anchored against an edge of the housing 10, and hooked over the arm 45 so as to urge counterclockwise rotation of the arm about the pivot screw 46 whereby to press the roller 41 against the sprocket 26 and the idler roller 27.

The lower pressure roller 42 is identical in construction and operation to the upper pressure roller 41. Each of the rollers 41 and 42 is provided with a handle 44 fixed on an extension of the shaft 43, and as is best shown in Figure 1, a portion of the end plate 21 is cut away adjacent each roller to provide access in order that the roller may be lifted by means of the handle for the purpose of inserting a film in the mechanism.

When the film has been inserted under each of the rollers 41 and 42 and engaged with the teeth of the sprocket 26, it is held in a curved plane defined by the peripheries of the sprocket and roller 27. Such a curved plane, concave in the direction of light passing therethrough, is ideal for projection systems of the type disclosed herein. Previous projectors and cameras of the continuous motion type have included curved gates through which the film slid, thus being subjected to the abrasive action previously referred to. It will be seen, however, that in the present construction, since the sprocket and the roller 27 may move freely with the film, it is subjected to no abrasive action.

Driving connection between the rotating sprocket 26 and the prism 25 is effected by means of a gear train which includes a drive gear 32 secured to the hollow hub of the sprocket 26, a pair of speed increasing gears 35 and 36 integrally mounted and meshed with the drive gear 32 and a driven gear 33, respectively. The speed increasing gears 35 and 36 are mounted on a needle point shaft 37 which is rotatably held in a pair of jewel bearings 38 and is hence adapted to rapid and friction-free rotation. The ratio of the gears 32 and 35 in this instance is such that the speed increasing gears 35 and 36 rotate at twice the speed of the sprocket 26, and the two gears 36 and 33 are of the same diameter; hence the prism is driven at the same speed as the speed increasing gears, that is, twice the speed of the sprocket 26. As best seen in Figures 1 and 3, a protrusion 17 is provided in the upper part of the housing 10 in order to accommodate the speed increasing gears 35 and 36.

Turning now to a discussion of the optical system employed in the present construction, reference is made to Figure 4. Light is provided by means of the conventional projection lamp 49 shown schematically in Figure 4 and is converted to substantially parallel light by means of the condenser lens 48 whence it passes through the cut-away portion of the housing 10, through the film 16, through the rotating prism 25, through the projection lens 14, and hence to the projection screen. The projection lens 14 is movably mounted in the conventional manner so that an image of the film 16 may be focussed on screens at various distances from the projector.

As can be best seen in Figure 3, sufficient space is left between the inner edges of the sprocket 26 and idler roller 27 to permit the passage therebetween of the light rays from the film 16 to the projection lens 14.

In order now to prepare the projector for operation, the film is first threaded as follows. The snap catch 40 is released and the light housing 11 swung back on its hinge 19 to permit access to the threading path. The roller 41 is lifted and the film placed thereunder and in engagement with teeth on the sprocket 26, the roller lowered against the sprocket 26 thereby to clamp the film between itself and the sprocket 26. The film is then wrapped around the sprocket 26 and the idler roller 27 and passed under the lower pressure roller 42. The film is then threaded into the take-up reel 13, the light housing 11 swung closed into the position shown in Figure 1 and the projector is ready to operate.

As the film moves downwardly from the supply reel 12 onto the take-up reel 13, its motion through the projector 10 causes counterclockwise rotaton of the sprocket 26 which, operating through the gear train comprising gears 32, 35, 36 and 33, consecutively, causes double speed, counterclockwise rotation of the prism 25 as shown in Figure 4.

The rotating prism 25 operates to hold the image of each successive frame on the film 16 stationary on the projection screen throughout the period of time that it takes a frame to pass through the projection gate. The projection gate or frame area is of sufficient vertical dimension to accommodate more than one of the successive frames. Thus it will be seen that at one given instant there are two superimposed images on the projection screen, these being the images of two successive frames of the film. It should be noted further that the intensity of the projected image of any frame changes during the passage of said frame through the projection gate reaching a maximum at the time that the center of the frame crosses the optical axis. Thus, considering the nature of the projected image at successive times during the operation of the device, it will be seen that such an image is either one relatively bright image or at a later time, two relatively dim, superimposed images of succeeding adjacent frames.

The foregoing type of projection is a vast improvement over conventional motion picture projection in that in the present instance there is, at all times, an illuminated image on the screen, whereas in previous projection systems, the screen is dark for a large proportion of the time. This intermittent darkening of the screen in conventional projection systems results in the well-known flickering of the projected image which is extremely tiring to the eyes and makes it impossible or highly impractical to run the film through the projector at a rate much slower than sixteen frames per second. In the projection system embodying my invention, on the other hand, the film may be run through the projector at any speed that is desired and the successive images will appear to blend one into the other, giving an effect of "slow motion," without an intermittent blinking or flickering of the image.

The film may be driven through the projector either by power driving the take-up reel 13 or by applying power to any one of the rotary members of the system, viz., the prism 25, the intermediate gears 35—36, or the sprocket 26. If power is applied within the projector much as just described, auxiliary driving means must be provided for the take-up reel 13 as is well known in the art.

Since there is no sliding friction resisting the motion of film through apparatus embodying the present invention, very much less effort is required to move the film. Furthermore, the mechanism disclosed herein is entirely free from the noise and vibration which is produced in intermittent motion machines.

While the apparatus shown and described herein is fully capable of achieving the objects and providing the advantages hereinbefore stated, it is capable of considerable modification within the spirit of the invention, and for that reason I do not mean to be limited to the precise form shown and described herein, but rather to the scope of the appended claims.

I claim:

1. In continuous motion, continuous illumination cinematographic apparatus: a rotatable film sprocket having a relatively narrow peripheral face engageable with the perforated edge of a motion picture film moving continuously through said apparatus; an idle roller equal in diameter to said sprocket and adapted to support an edge of said film opposite said sprocket-engaged edge, said roller being coaxial with said sprocket and spaced therefrom a distance substantially equal to the width of the picture area of said film; means defining an optical path through the space between said roller and sprocket, said path including a frame area in a portion of said film engaged with said sprocket; a rotatable multi-faceted prism coaxially disposed within said space, positioned and adapted for the continuous passage of light therethrough during the rotation thereof, and interposed in said optical path, said prism being adapted to arrest images of frames in said moving film and to continuously superimpose adjacent pairs of said images whereby to produce a continuously illuminated motion picture image; and a gear train connecting said sprocket and prism for concurrent rotation, said gear train being adapted to step up the speed of rotation between said sprocket and prism whereby to rotate the latter at twice the speed of the former.

2. In continuous motion, continuous illumination cinematographic apparatus: a rotatable film sprocket having a relatively narrow film engaging face engageable with the perforated edge of a motion picture film moving continuously through said apparatus; an idler roller equal in diameter to said sprocket and adapted to support an edge of said film opposite said sprocket-engaged edge, said roller being coaxial with said sprocket and spaced therefrom a distance substantially equal to the width of frames of said film; means defining an optical path through said space between said roller and sprocket, said path including a frame area in a portion of said film engaged with said sprocket; pressure roller means adapted to exert pressure toward said sprocket to hold said film in engagement therewith; a lens focusable on a frame area of a portion of said film engaged with said sprocket; a rotatable multi-faceted prism positioned and adapted for the continuous passage of light therethrough during rotation thereof, said prism being concentrically disposed within said sprocket and idler and interposed in the optical path between said lens and film whereby to arrest images of frames in the latter; and a gear train connecting said sprocket and prism for concurrent rotation, said gear train being adapted to step up the speed of rotation between said sprocket and prism whereby to rotate the latter at twice the speed of the former.

3. In continuous motion, continuous illumination cinematographic apparatus; a rotatable film sprocket having a relatively narrow peripheral face engageable with the perforated edge of a motion picture film moving continuously through said apparatus; an idler roller adapted to support an edge of said film opposite said sprocket-engaged edge, said roller being spaced therefrom a distance substantially equal to the width of the picture area of said film; means defining an optical path through the space between said roller and sprocket, said path including a frame area in a portion of said film engaged with said sprocket; a rotatable multi-faceted prism coaxially disposed adjacent said sprocket, positioned and adapted for the continuous passage of light therethrough during the rotation thereof, and interposed in said optical path, said prism being adapted to arrest images of frames in said moving film and to continuously superimpose adjacent pairs of said images whereby to produce a continuously illuminated motion picture image; and a gear train connecting said sprocket and prism for concurrent rotation, said gear train being adapted to step up the speed of rotation between said sprocket and prism.

WILLIAM H. HARRISON.

REFERENCES CITED

The following references are of record in the file of this patent:

UNITED STATES PATENTS

| Number    | Name      | Date           |
|-----------|-----------|----------------|
| 1,827,206 | Owens     | Oct. 13, 1931  |
| 1,928,088 | Bladowski | Sept. 26, 1933 |
| 1,991,957 | Ranieri   | Feb. 19, 1935  |
| 2,422,816 | Baia      | June 24, 1947  |

FOREIGN PATENTS

| Number  | Country       | Date           |
|---------|---------------|----------------|
| 312,645 | Great Britain | Nov. 28, 1930  |
| 517,472 | Great Britain | Jan. 31, 1940  |
| 212,470 | Switzerland   | Mar. 3, 1941   |